(12) United States Patent
Park

(10) Patent No.: US 8,134,340 B2
(45) Date of Patent: Mar. 13, 2012

(54) BATTERY MANAGEMENT SYSTEM

(75) Inventor: Jongdoo Park, Yongin-si (KR)

(73) Assignee: SB Limotive Co., Ltd., Yongin-si (KR)

( * ) Notice: Subject to any disclaimer, the term of this patent is extended or adjusted under 35 U.S.C. 154(b) by 41 days.

(21) Appl. No.: 12/851,508

(22) Filed: Aug. 5, 2010

(65) Prior Publication Data

US 2011/0050000 A1    Mar. 3, 2011

(30) Foreign Application Priority Data

Aug. 26, 2009 (KR) .................. 10-2009-0079176

(51) Int. Cl.
*H02J 7/00* (2006.01)
*H01M 10/46* (2006.01)

(52) U.S. Cl. ....................... 320/134; 320/136
(58) Field of Classification Search ............... 320/134, 320/136
See application file for complete search history.

(56) References Cited

U.S. PATENT DOCUMENTS

| 3,974,660 | A * | 8/1976 | Farr ........................ 62/229 |
| 7,719,235 | B2 * | 5/2010 | Sano et al. ................. 320/136 |
| 2008/0074082 | A1 | 3/2008 | Tae et al. |
| 2009/0295335 | A1 * | 12/2009 | Yang et al. ................. 320/134 |
| 2011/0003182 | A1 * | 1/2011 | Zhu ........................ 429/50 |

FOREIGN PATENT DOCUMENTS

| JP | 2003-143751 | 5/2003 |
| KR | 1998-0055789 U | 10/1998 |
| KR | 10-2002-0064570 | 8/2002 |
| KR | 10-0451637 B1 | 10/2004 |
| KR | 1020080028160 A | 3/2008 |
| KR | 1020080042347 A | 5/2008 |
| KR | 10-0846710 B1 | 7/2008 |
| KR | 10-2009-0026417 | 3/2009 |

OTHER PUBLICATIONS

KIPO Office action dated Feb. 21, 2011, for Korean priority Patent application 10-2009-0079176.
Patent Abstracts of Japan and English Machine Translation of Japanese Publication 2003-143751.
Korean Patent Abstracts, Publication No. 1020030096978, dated Dec. 31, 2003, corresponding to Korean Patent 10-0451637.
Korean Patent Abstracts, Publication No. 1020080022676, dated Mar. 12, 2008, corresponding to Korean Patent 10-0846710.

* cited by examiner

*Primary Examiner* — M'Baye Diao
(74) *Attorney, Agent, or Firm* — Christie, Parker & Hale, LLP

(57) ABSTRACT

A battery management system capable of safely disconnecting a charge/discharge current line from a battery pack in an over-charge condition is provided. The battery management system includes a charge/discharge relay including a relay switch coupled to a charge/discharge current path of a battery pack and a driving coil for driving the relay switch, a relay driving unit for controlling the driving coil, a motor control unit (MCU) for controlling the relay driving unit, the MCU being coupled to the relay driving unit, a switching device being coupled between the driving coil and the relay driving unit, and a switching control unit for controlling on/off operations of the switching device to control a current of the relay driving unit.

11 Claims, 3 Drawing Sheets

BATTERY MANAGEMENT SYSTEM

CROSS-REFERENCE TO RELATED APPLICATION

This application claims priority to and the benefit of Korean Patent Application No. 10-2009-0079176, filed on Aug. 26, 2009, the entire content of which is incorporated herein by reference.

BACKGROUND

1. Field

An aspect of one or more embodiments of the present invention relates to a battery management system.

2. Description of the Related Art

Unlike primary batteries which are generally not rechargeable, secondary batteries may be rechargeable (i.e., charged and discharged). Low-capacity secondary batteries are widely employed in high-technology electronic devices such as cellular phones, laptop computers, and camcorders while large-capacity secondary batteries are typically used for driving larger loads such as motors of electric automobiles or hybrid automobiles.

When battery cells are used in electric automobiles, limited power capacity of the battery cells may become a problem. To address the problem, a battery pack may include a plurality of battery cells interconnected electrically in series/parallel. In such a battery pack having a number of interconnected battery cells, an overall capacity of the battery pack can be increased. Further, the battery pack is readily configurable to various capacities and voltages according to the number of battery cells connected, thereby improving versatility from the viewpoint of capacity and voltage outputs.

SUMMARY

An aspect of one or more embodiments according to the present invention relates to a battery management system capable of safely disconnecting a charge/discharge current line from a battery pack in an over-charge condition.

In accordance with an embodiment of the present invention, there is provided a battery management system that includes a charge/discharge relay including a relay switch coupled to a charge/discharge current path of a battery pack and a driving coil for driving the relay switch, a relay driving unit for controlling the driving coil, a motor control unit (MCU) for controlling the relay driving unit, the MCU being coupled to the relay driving unit, a switching device being coupled between the driving coil and the relay driving unit, and a switching control unit for controlling on/off operations of the switching device to control a current of the relay driving unit.

The switching device may be serially coupled to the driving coil of the charge/discharge relay.

The MCU and the switching control unit may be configured to operate independently of each other.

The switching device may be coupled to both ends of at least one selected from a battery cell, a battery subpack, and a battery pack.

The relay switch of the charge/discharge relay may be normally in a turn-off state or a turn-on state.

The switching device may include a transistor coupled to the switching control unit.

The transistor may have a control electrode coupled to the switching control unit.

The transistor may have a first electrode and a second electrode coupled respectively to the driving coil of the charge/discharge relay and the relay driving unit.

The switching device may include a control relay switch coupled between the relay driving unit and the driving coil of the charge/discharge relay, and a control driving coil coupled to the switching control unit to drive the control relay switch.

The control relay switch may be normally in a turn-off state or a turn-on state.

When the switching device is turned off by the switching control unit, a signal indicating that the switching device is turned off may be displayed on an external display device or an alarm may be generated.

The battery management system according to exemplary embodiments of the present invention includes a switching device and a switching control unit to safely protect a battery pack in an over-charge condition of the battery pack, the switching device being coupled between a relay driving unit and a driving coil and being configured to turn on/off by the switching control unit. The switching control unit operates independently of an MCU in the current path of the driving coil for driving a relay switch coupled to a charge/discharge current line of the battery pack.

BRIEF DESCRIPTION OF THE DRAWINGS

The features and aspects of the present invention will be more apparent from the following detailed description in conjunction with the accompanying drawings, in which.

DETAILED DESCRIPTION

During charging, the plurality of connected (e.g., in series or parallel) battery cells in the battery pack are concurrently (e.g., simultaneously) charged by connecting output terminals of the battery pack to a charger. In this regard, in order to improve the reliability and stability of the battery pack, a structure for preventing overcharging of the battery cells constituting the battery pack is desirable.

Hereinafter, an embodiment of the present invention will be described in detail with reference to the accompanying drawings so that it can be easily applied by those of ordinary skill in the art. Here, when a first element is described as being coupled or connected to a second element, the first element may be directly coupled to the second element or indirectly coupled to the second element via one or more third elements.

A description will now be made of a structure of a battery management system according to an embodiment of the present invention.

Figure 1:
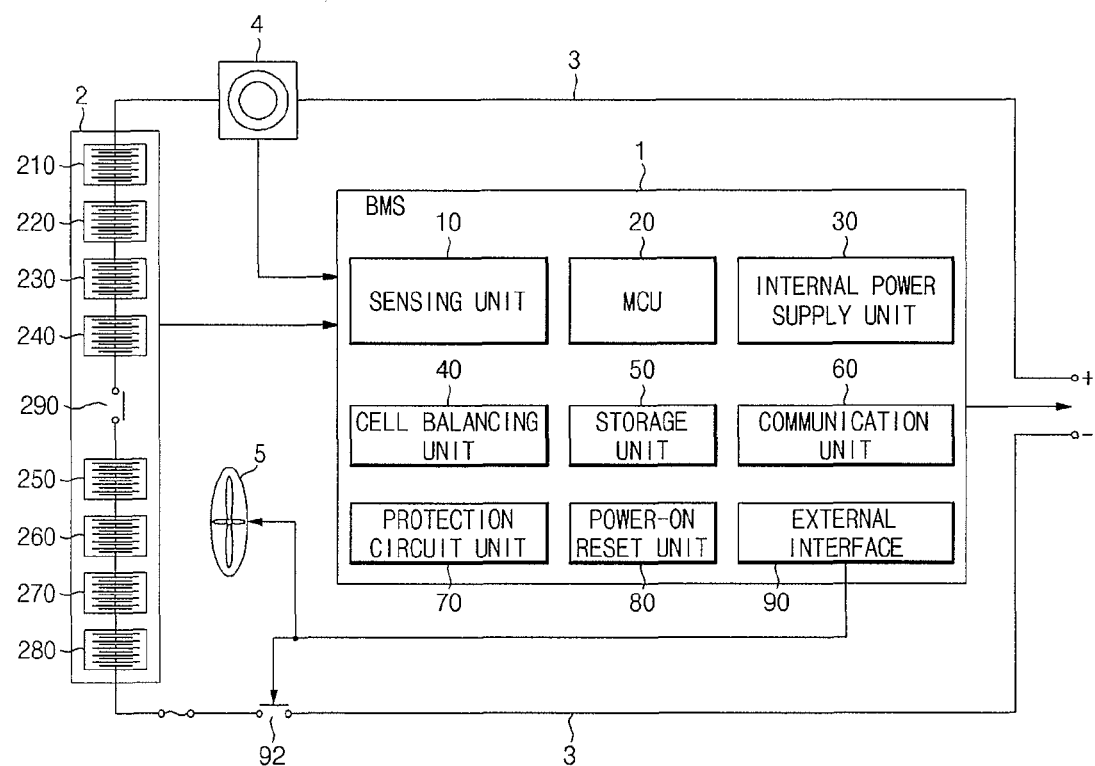
FIG. 1 shows a schematic diagram illustrating a battery management system according to an embodiment of the present invention.
Figure 2:
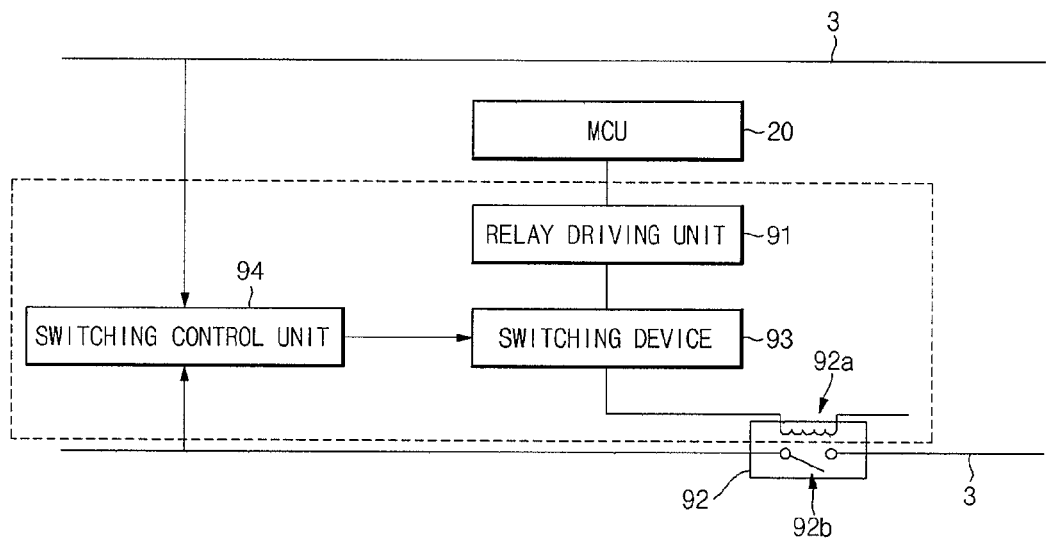
FIG. 2 shows a detailed diagram of an external interface used in the secondary battery according to an exemplary embodiment of the present invention.

FIG. 1 shows a schematic diagram illustrating a battery management system according to an embodiment of the present invention, and FIG. 2 shows a detailed diagram of an external interface used in the secondary battery according to an exemplary embodiment of the present invention.

Referring to FIGS. 1 and 2, the battery management system (abbreviated to "BMS") 1 according to an embodiment of the present invention includes a motor control unit (abbreviated to "MCU") 20, and an external interface 90 coupled to the MCU 20 and electrically connected to a charge/discharge current line 3.

The BMS 1 may further include a sensing unit 10, an internal power supply unit 30, a cell balancing unit 40, a storage unit 50, a communication unit 60, a protection circuit unit 70, and a power-on reset unit 80.

The BMS 1 may further include (or be connected to) such peripheral devices as a battery pack 2, a current sensor 4, a cooling fan 5, and a fuse element 6.

The sensing unit 10 measures an overall voltage of the battery pack 2, and voltages of subpacks 210 to 280 and/or voltages of battery cells constituting each of the subpacks 210 to 280. In addition, the sensing unit 10 measures currents flowing through the charge/discharge current line 3 and the battery pack 2 by the current sensor 4.

The sensing unit 10 may also measure a temperature and ambient temperature of each battery cell. Values of the voltages and temperatures measured by the sensing unit 10 are transmitted to the MCU 20.

The MCU 20 determines a state of charge (SOC) and a state of health (SOH) of the battery pack 2 based on the voltages and temperatures transmitted from the sensing unit 10. Accordingly, the MCU 20 controls charging and discharging operations of the battery pack 2.

When an overcharge condition occurs to the battery pack 2, the MCU 20 may shut down (e.g., disconnect) a path of the charge/discharge current line 3 to interrupt charging of the battery pack 2. Charging and discharging of the battery pack 2 are controlled through the external interface 90, which will later be described in more detail.

In one embodiment of the present invention, the internal power supply unit 30 supplies power to the BMS 1 using an auxiliary (backup) battery (not shown). The internal power supply unit 30 may perform a charging operation through an external power supply unit. In an exemplary embodiment of the present invention, in a case where the battery pack 2 is used in an hybrid electric vehicle (HEV), etc., the internal power supply unit 30 may be supplied with power from a lead-acid battery of a hybrid or electric vehicle to perform a charging operation.

The cell balancing unit 40 performs balancing operations according to states of charge and discharge of battery cells constituting each of the subpacks 210 to 280 of the battery pack 2. That is to say, the cell balancing unit 40 discharges over-charged cells (i.e., relatively less discharged cells) of the battery cells, and charges relatively less charged cells (i.e., over-discharged cells) of the battery cells, thereby maintaining the respective battery cells at substantially uniform SOC levels.

The storage unit 50 stores various data values, including SOC, SOH, etc., immediately before the BMS 1 is turned off. Accordingly, when the BMS 1 is turned on afterward, the MCU 20 can retrieve the data values corresponding to data values stored at the time when the MCU 20 is last turned off. To this end, an electrically erasable programmable read only memory (EEPROM) may be used as the storage unit 50. In an embodiment, the storage unit 50 is an EEPROM, but the present invention is not be limited thereto.

The communication unit 60 communicates with, for example, a motor controller (not shown) or an engine control unit (not shown). The communication unit 60 allows a motor of a vehicle to utilize power of the battery pack 2. In addition, the communication unit 60 allows an engine to be driven when the motor is not driven.

The protection circuit unit 70 protects the battery pack 2 from external impacts, over-current, over-voltage, etc.

The power-on reset unit 80 resets the overall system when the BMS 1 is turned on.

The external interface 90 allows the cooling fan 5 to be connected to the MCU 20. In addition, the external interface 90 allows a main switch 92 of the charge and discharge current line 3 connected to the battery pack 2 to be connected to the MCU 20.

Referring to FIG. 2, the external interface 90 includes a relay driving unit 91 connected to the MCU 20, a charge/discharge relay 92 connected to the relay driving unit 91 and the charge/discharge current line 3, the switching device 93 provided between the relay driving unit 91 and the charge/discharge relay 92, and a switching control unit 94 for controlling the switching device 93.

The relay driving unit 91 receives a control signal from the MCU 20 and controls a current supplied to the charge/discharge relay 92. That is, when the battery pack 2 is overcharged, the MCU 20 applies the control signal to the relay driving unit 91 to turn off the current supplied to the charge/discharge relay 92. Thus, the current supplied via the charge/discharge current line 3 is shut down.

The charge/discharge relay 92 is connected between the relay driving unit 91 and the charge/discharge current line 3. The charge/discharge relay 92 includes a driving coil 92a connected to the relay driving unit 91, and a relay switch 92b connected to the charge/discharge current line 3, and the relay switch 92b is controlled to operatively switch between on/off operations by the driving coil 92a.

The driving coil 92a controls the on/off operations of the relay switch 92b. Since a physical current path is not formed between the driving coil 92a and the relay switch 92b, the relay switch 92b connected to the charge/discharge current line 3, through which a relatively high current flows, can be controlled by using the control signal supplied from the MCU 20.

The on/off operations of the relay switch 92b are controlled by supplying or interrupting a current to the driving coil 92a. In an over-charge condition, the relay switch 92b is turned off to shut down the charge/discharge current line 3 of the battery pack 2, thereby safely protecting the battery pack 2.

In a case where the relay switch 92b is normally in a turn-off state, when the battery pack 2 is in a normal condition, a current flows through the driving coil 92a and the relay switch 92b maintains a turn-on state. In an over-charge condition, however, the current is interrupted to flow through the driving coil 92a, which makes the relay switch 92b turn off.

In a case where the relay switch 92b is normally in a turn-on state, when the battery pack 2 is in a normal condition, a current does not flow through the driving coil 92a and the relay switch 92b maintains a turn-on state. In an over-charge condition, however, a current is applied to the driving coil 92a to turn off the relay switch 92b.

The switching device 93 is connected between the relay driving unit 91 and the driving coil 92a. The switching control unit 94 is connected to the switching device 93 to control the on/off operations of the switching device 93. The switching control unit 94 operates independently of the MCU 20. In other words, when the battery pack 2 is overcharged, the switching control unit 94 operates irrespective of a control signal output from the MCU 20 to turn off the switching device 93, thereby interrupting the current flowing from the relay driving unit 91 to the driving coil 92a and ultimately opening the relay switch 92b. Accordingly, in the over-charge condition, the switching device 93 and the switching control unit 94 can protect the battery pack 2 in a safer manner.

Referring back to FIG. 1, reference numeral 6 denotes a fuse element. If an over-current applied to the charge/discharge current line 3 connected to the battery pack 2 resulting in over-heating of the fuse element 6, the fuse element 6 disconnects the battery pack 2 from the charge/discharge current line 3 to protect the battery pack 2, and the motor of the vehicle is protected from the over-current. Reference numeral 290 denotes a safety switch. The safety switch 290 is provided between the subpacks 210 to 280 constituting the battery pack 2 to interrupt the current flowing through the battery pack 2 in an event of overcharging of the battery pack 2.

Hereinafter, an example of the external interface 90 according to an embodiment of the present invention will be described.

Figure 3:
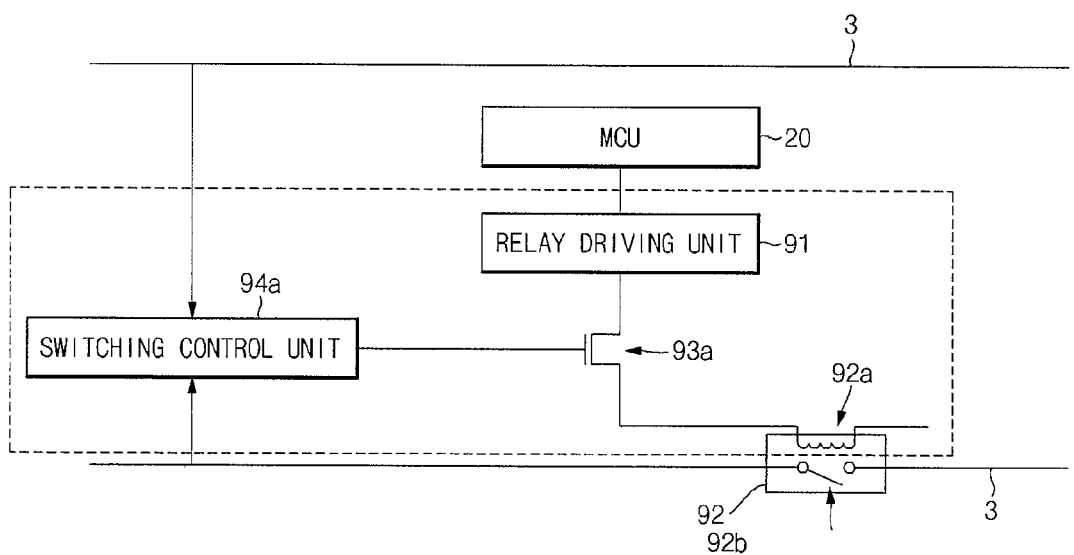
FIG. 3 shows a circuit diagram of the external interface illustrated in FIG. 2 according to an exemplary embodiment of the present invention.

FIG. 3 shows a circuit diagram of the external interface illustrated in FIG. 2 according to one embodiment of the present invention.

Referring to FIG. 3, the switching device 93 constituting the external interface 90 includes a switching transistor 93a. The switching transistor 93a has a control electrode connected to a switching control unit 94a, a first electrode connected to the relay driving unit 91, and a second electrode connected to the driving coil 92a. The switching transistor 93a is shown as an N-type metal oxide semiconductor field effect transistor (MOSFET) by way of example, and is not intended to limit the scope of the present invention.

As an over-charge condition is detected, a control signal is applied to the switching control unit 94a, and the switching transistor 93a is then turned off. As a result, a current path from the relay driving unit 91 to the driving coil 92a is shut down, so that the relay switch 92b is turned off, thereby ceasing a charging operation. Accordingly, as described above, since the switching control unit 94a operates independently of the MCU 20, the current flowing through the charge/discharge current line 3 can be safely interrupted in an over-charge condition.

Hereinafter, another example of the external interface 90 according to an embodiment of the present invention will be described.

Figure 4:
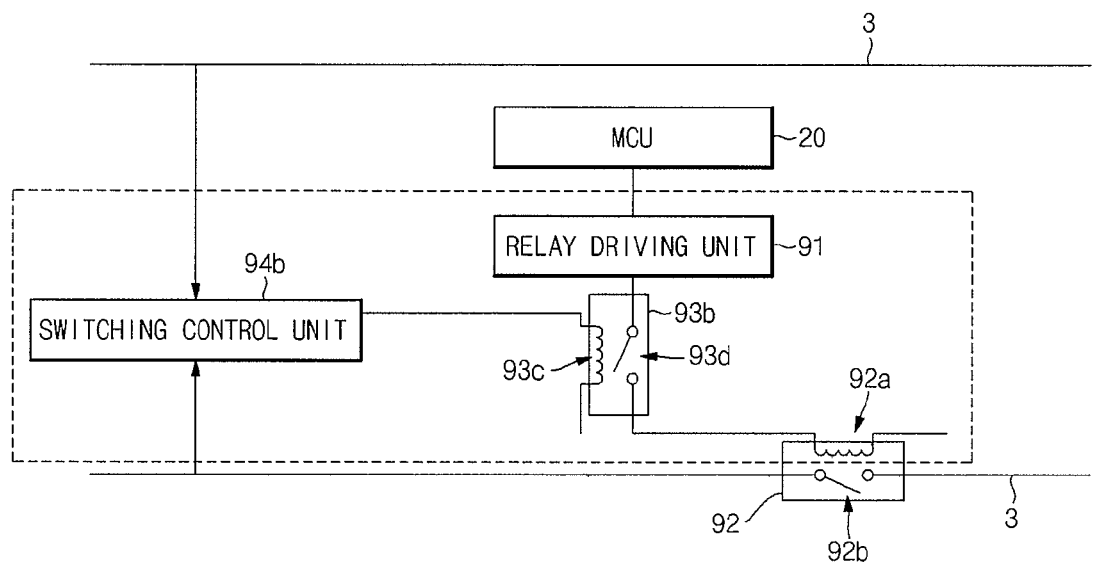
FIG. 4 is a circuit diagram of the external interface illustrated in FIG. 2 according to an exemplary embodiment of the present invention.

FIG. 4 is a circuit diagram of the external interface illustrated in FIG. 2 according to one embodiment of the present invention.

Referring to FIG. 4, the switching device 93 forming the external interface 90 includes a control relay 93b which includes a control driving coil 93c and a control relay switch 93d. The control driving coil 93c controls the control relay switch 93d which is positioned between the relay driving unit 91 and the driving coil 92a.

In an example, if the control relay switch 93b is normally in a turn-off state, the control relay switch 93b is in a turn-on state when a switching control unit 94b applies a current to the control driving coil 93c. Then, when no current is supplied to the control driving coil 93c, the control relay switch 93d is turned off, so that a current path from the relay driving unit 91 to the driving coil 92a is shut down and the relay switch 92b formed in the charge/discharge current line 3 is then disconnected. Accordingly, as mentioned above, since the switching control unit 94b operates independently of the MCU 20, the current flowing through the charge/discharge current line 3 can be more safely interrupted in an over-charge condition.

As described above, the battery management system according to an embodiment of the present invention includes a switching control unit operating independently of a motor control unit (MCU) to control a current path of a driving coil for driving a relay switch connected to a charge/discharge current line of a battery pack, so that the switching control unit 94 controls the current flowing through the driving coil 92 in an over-charge condition, thereby safely protecting the battery pack 2.

In one embodiment of the present invention, when the switching device is turned off by the switching control unit, a signal indicating that the switching device is turned off may be displayed on an external display device, or an alarm is generated.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims and their equivalents.

What is claimed is:

1. A battery management system comprising:
   a charge/discharge relay comprising a relay switch coupled to a charge/discharge current path of a battery pack and a driving coil for driving the relay switch;
   a relay driving unit for controlling the driving coil;
   a motor control unit (MCU) for controlling the relay driving unit, the MCU being coupled to the relay driving unit;
   a switching device coupled between the driving coil and the relay driving unit; and
   a switching control unit for controlling on/off operations of the switching device to control a current of the relay driving unit.

2. The battery management system of claim 1, wherein the switching device is serially coupled to the driving coil of the charge/discharge relay.

3. The battery management system of claim 1, wherein the MCU and the switching control unit are configured to operate independently of each other.

4. The battery management system of claim 1, wherein the switching device is coupled to both ends of at least one selected from a battery cell, a battery subpack, and a battery pack.

5. The battery management system of claim 1, wherein the relay switch of the charge/discharge relay is normally in a turn-off state or a turn-on state.

6. The battery management system of claim 1, wherein the switching device comprises a transistor coupled to the switching control unit.

7. The battery management system of claim 6, wherein the transistor has a control electrode coupled to the switching control unit.

8. The battery management system of claim 6, wherein the transistor has a first electrode and a second electrode coupled respectively to the driving coil of the charge/discharge relay and the relay driving unit.

9. The battery management system of claim 1, wherein the switching device comprises:
 a control relay switch coupled between the relay driving unit and the driving coil of the charge/discharge relay; and
 a control driving coil coupled to the switching control unit to drive the control relay switch.

10. The battery management system of claim 9, wherein the control relay switch is normally in a turn-off state or a turn-on state.

11. The battery management system of claim 1, wherein when the switching device is turned off by the switching control unit, a signal indicating that the switching device is turned off is displayed on an external display device or an alarm is generated.

* * * * *